UNITED STATES PATENT OFFICE 2,668,840

O-(4-NITROPHENYL) N,N-DIETHYLAMIDO-ALKANEPHOSPHONATES

Henry Tolkmith, Midland, Mich., assignor to The Dow Chemical Company, Midland, Mich., a corporation of Delaware No Drawing. Application April 21, 1953,
Serial No. 350,223

3 Claims. (Cl. 260—461)

The present invention is directed to the O-(4-nitrophenyl) N,N-diethylamidoalkanephosphonates of the formula

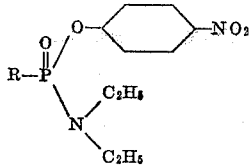

In this and succeeding formulae R represents methyl or ethyl. These new compounds are viscous oils, somewhat soluble in many organic solvents and substantially insoluble in water. They are of value as intermediates for the preparation of more complex phosphorus derivatives and as toxic constituents of parasiticide compositions.

The new compounds may be prepared by reacting at least one molecular proportion of an alkali metal 4-nitrophenolate with one molecular proportion of N,N-diethylamidoalkanephosphonic chloride of the formula

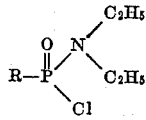

in an inert organic solvent such as benzene or toluene. Of the alkali metal phenolates found useful in the reaction, it is preferred to employ the sodium compound.

In carrying out the reaction, the sodium 4-nitrophenolate is added portionwise with stirring to the N,N-diethylamidoalkanephosphonic chloride dispersed in the solvent and the resulting mixture thereafter heated for a period of time to a temperature of from 110° to 130° C. to complete the reaction. The reaction is somewhat exothermic and takes place smoothly at the temperature range of from 100° to 130° C. The temperature may be controlled by regulation of the rate of contacting the reactants as well as by the addition and subtraction of heat, if required. Upon completion of the reaction, the mixture may be filtered and the filtrate distilled under reduced pressure at gradually increasing temperatures up to a temperature of 150° C. to separate low boiling constituents and to obtain as a residue the desired product. Distillation temperatures substantially in excess of 150° C. for any appreciable period of time should be avioded as the desired products have a tendency to decompose at such temperature.

The N,N-diethylamidoalkanephosphonic chlorides employed as starting materials in the above-described method may be prepared by reacting one molecular proportion of diethylamine with at least two molecular proportions of an alkanephosphonic dichloride in an inert organic solvent such as benzene. The reaction is carried out in the presence of a hydrogen chloride acceptor, which may conveniently be an excess of the amine reactant. In carrying out the reaction, the diethylamine is added portionwise with stirring to the alkanephosphonic dichloride dispersed in the solvent. The reaction is somewhat exothermic and takes place smoothly at temperatures of from 20° to 40° C. The temperature may be controlled by regulation of the rate of contacting the reactants as well as by the addition and subtraction of heat, if required. Upon completion of the reaction, the mixture may be filtered and the filtrate fractionally distilled under reduced pressure to separate the desired product. N,N-diethylamidomethanephosphonic chloride and N,N-diethylamidoethanephosphonic chloride are viscous oils having a boiling point of 135° C. and 140° C., respectively, at 27 millimeters pressure.

*Example 1.—O-(4-nitrophenyl) N,N-diethylamidomethanephosphenate*

75 grams (0.463 mole) of sodium 4-nitrophenolate was added portionwise with stirring to 55 grams (0.325 mole) of N,N-diethylamidomethanephosphonic chloride dispersed in 550 milliliters of toluene and the resulting mixture heated for 2 hours at the boiling temperature and under reflux to complete the reaction. At the end of this period, the mixture was filtered and the filtrate concentrated by distillation under reduced pressure to a temperature up to 140° C. to obtain as a residue O-(4-nithophenyl) N,N-diethylamidomethanephosphonate. The latter is a viscous oil having a density of 1.252 at 22° C. and a refractive index n/D of 1.5510 at 20° C.

*Example 2.—O-(4-nitrophenyl), N,N-diethylamidoethanephosphonate*

18.5 grams (0.113 mole) of sodium 4-nitrophenolate was added portionwise with stirring to 16 grams (0.087 mole of N,N-diethylamidoethanephosphonic chloride dispersed in 150 milliliters of toluene and the resulting mixture heated for 2 hours at the boiling temperature and under reflux to complete the reaction. At the end of this period, the mixture was filtered and the filtrate concentrated by distillation under reduced pressure to a temperature up to 110° C. to obtain as a residue O-(4-nitrophenyl) N,N-diethylamidoethanephosphonate. The latter is a viscous oil having a refractive index $n/D$ of 1.5495 at 20° C.

The new O-(4-nitrophenyl) N,N-diethylamidoalkanephosphonates products are effective as a parasiticides and adapted to be employed for the control of a wide range of agricultural and household pests such as flies, mites, aphids, beetles, cockroaches and Southern army worms. For such use, the compounds may be dispersed on an inert finely divided solid and employed as a dust. Also, such mixtures may be dispersed in water with the aid of a dispersing and wetting agent and the resulting aqueous suspensions employed as sprays. In other procedures, the new products may be employed in oils, as a constituent in oil-in-water emulsions, or in water dispersion with or without the addition of emulsifying, wetting or dispersing agents. Suitable concentrations of the toxicants in dusts are in the order of from about 0.1 to 10 per cent by weight of the dust and in liquid suspensions from about 0.1 to 3 pounds per 100 gallons of the spray mixture. In an operation illustrative of the effectiveness of the new compounds, 100 per cent kills of two-spotted spider mites and Mexican bean beetles were obtained with aqueous spray compositions containing 1.0 pound of the toxic O-(4-nitrophenyl) N,N-diethylamidomethanephosphonate per 100 gallons of spray mixture.

This is a continuation in part of my copending application Serial No. 203,750, filed December 30, 1950.

I claim:

1. An O-(4-nitrophenyl) N,N-diethylamidoalkanephosphonate of the formula

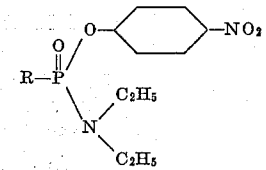

wherein R represents a member of the group consisting of methyl and ethyl.

2. O - (4 - nitrophenyl) N,N - diethylamidomethanephosphonate.

3. O - (4 - nitrophenyl) N,N - diethylamidoethanephosphonate.

HENRY TOLKMITH.

No references cited.